March 26, 1935.   H. KATZ   1,995,617
LENS LINING FOR SPECTACLE FRAMES

Filed Dec. 15, 1931

INVENTOR.
Herman Katz
BY Joseph B. Gardner
ATTORNEY.

Patented Mar. 26, 1935

1,995,617

UNITED STATES PATENT OFFICE 1,995,617

LENS LINING FOR SPECTACLE FRAMES

Herman Katz, Oakland, Calif.

Application December 15, 1931, Serial No. 581,183

2 Claims. (Cl. 88—47)

The invention relates to a lining made of a cellulose composition or the like, and designed for interposition between the edge of the lens and rim of the frame to tighten loose lenses in the frame. Heretofore such lining has usually been marketed in the form of straight strips grooved or curved in cross-section for engaging the lens edge and made in lengths sufficient only for extending about one-third the distance around the lens circumference. As may be readily understood, since most lenses have a cylindrical or elliptical periphery, considerable inconvenience is encountered, in view of the resilient nature and shortness of the strips, in conforming the strips to the curvature of such periphery and piecing them therearound whereby the lining may be cemented and positioned about the lens and within the frame rim. To market the liners in the form of closed ring washers is more or less impractical owing to the difficulty of fitting them over the lenses and the many different sizes of lenses. Accordingly it is an object of my invention to provide the lining in such form that first, it may be readily applied in a continuous piece one or more times around the lens, second, it will, due to its inherent shape, conform to the curvature of the periphery of the lens, third, it will avoid all waste, fourth it will lend itself to packaging with maximum compactness, and fifth, while portions thereof may be readily unwound and severed when desired, the unwound or unsevered portion will naturally remain in compactly wound condition.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
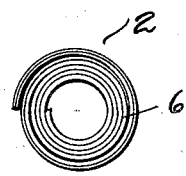
Figure 1 is a side view of the lining put up in accordance with my invention.
Figure 2:
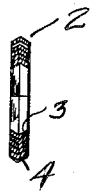
Figure 2 is a vertical transverse sectional view of the lining.
Figure 3:
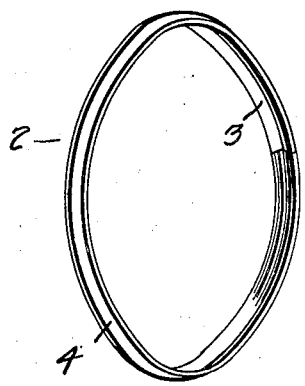
Figure 3 is an enlarged perspective view showing a portion of the lining.

In my invention, advantage is taken of the fact that first, the lining, as before noted, should be of concave or similar shape in cross section so that the lens edge may seat within the concavity and be effectively confined therein against transverse displacement, and second that the lining should be inherently curved in its length so as to conform to the periphery of the lens. I find by forming the lining of V-shaped cross-section and of inherently involute form with the successive convolutions in contacting relation, that the lining thus not only has the required design for fitting on the lens and in the frame rim, but that it may be formed of a single piece compactly wound in a relatively large but narrow roll from which lining portions of any desired length can be readily severed. Furthermore, owing to the cross-sectional form of the lining, and of the intimate relationship of the convolutions thereof, the superposed lining portions will nest one within the other so that while a length of the lining may be readily unwound when purposely effected, the lining will otherwise remain in its original wound form and always be maintained in the desired curvature.

The lining 2 as here shown is made in a long strip of one piece of material and formed of a width approximately equal to the thickness of the ordinary lens at the edge thereof. Preferably the lining is made of a cellulose composition and as shown in the drawing is formed V-shaped in transverse cross section with the concave and convex faces 3 and 4 thereof lying respectively innermost and outermost when the lining is curved in its length. The angle defined by the portions of the lining forming the V is comparatively sharp so that the convex side of the lining will effectively seat within the rim while the concave side will provide a deep seat for the reception of the lens and thus confine the lining against transverse displacement therein.

The lining is resilient, made inherently of spiral or involute form, and arranged in a roll 6 with the concave face 3 innermost and with the convolutions in intimate relation whereby the latter will nest compactly one within the other. It will be seen that by forming the lining of involute form with the opposing concave and convex faces of adjacent convolutions interengaged, not only is it possible with the single continuous lining to form a compact roll with the convolutions interlocked, but when portions of the lining are severed from the roll for use on the lens, such portions will in general conform to the circumference of the lens and thereby render the application of the lining to the lens and the interposition of the lining between the lens and rim extremely simple even by a relatively unskilled person. It will further be seen that a lining portion of any length may be readily severed from the roll so that a full lining for any size of lens is available from the one roll. This latter feature is of considerable importance since there is thus always available for use a full-length one-piece liner for every size lens, and the necessity of keeping on hand different sized washers or linings for each different sized lens is avoided. Also with the lining made in accordance with my invention, two, three, or more thicknesses of the lining may be applied in a single piece around the lens and fitted in the rim whereby a relatively small lens may be easily fitted in an otherwise inappropriately larger sized rim.

I claim:

1. A lens liner for spectacles arranged for insertion between the peripheral edge of the lens and retaining rim therefor of the spectacle for tightening the lens in the rim comprising, a flat spirally wound roll of resilient lining material having the successive convolutions thereof positioned adjacent each other radially having its reverse sides concave and convex to prevent transverse displacement and being arranged for unwiding and removing portions of the outer convolutions thereof for encircling said lens, the diameter of said outer convolutions being normally smaller than the diameter of said lens whereby said unwound portion while arranged with the opposite convolutions thereof adjacent while on the roll will have the outer convolutions resiliently drawn about in inner convolutions when expanded onto said lens.

2. A lens liner for spectacles arranged for insertion between the peripheral edges of the spectacle lens and rim therefor for tightening the lens in the rim comprising, a flat spirally wound roll of resilient non-metallic lining material having the successive convolutions thereof formed V-shaped in cross-section to nest one within the other in a substantially common radial plane, said roll being arranged for unwinding and removal of portions of the outer convolutins thereof for encircling said lens and being normally of a smaller diameter than said lens whereby said unwound portion when expanded around said lens will be tight fitting and by reason of its initial planar coiling aforesaid tend to lie in the plane of the lens.

HERMAN KATZ.